Aug. 23, 1938.   L. G. TUBBS   2,128,106
COMPENSATING MEANS
Filed May 23, 1935   2 Sheets-Sheet 1

WITNESSES:

INVENTOR
Lester G. Tubbs.
BY
ATTORNEY

Aug. 23, 1938.  L. G. TUBBS  2,128,106
COMPENSATING MEANS
Filed May 23, 1935  2 Sheets—Sheet 2

WITNESSES:
C. J. Weller.
C. F. Bryant

INVENTOR
Lester G. Tubbs.
BY Ezra W. Savage
ATTORNEY

Patented Aug. 23, 1938

2,128,106

UNITED STATES PATENT OFFICE 2,128,106

COMPENSATING MEANS

Lester G. Tubbs, Wilkinsburg, Pa., assignor to Westinghouse Electric & Manufacturing Company, East Pittsburgh, Pa., a corporation of Pennsylvania Application May 23, 1935, Serial No. 23,039

11 Claims. (Cl. 171—119)

My invention relates to regulator compensating means and it has particular relation to load compensating systems for electrical circuit voltage regulators. In the application of induction and other types of voltage regulators to feeder and other electrical circuits, it is frequently desired that the regulator change the value of voltage which it maintains as the load supplied by the circuit changes. Where, for example, it is necessary to maintain constant the voltage at a point distant from the regulator the necessary modified operation may be achieved by utilizing load compensating means which take account of the change in voltage drop along the circuit conductors as the circuit loading changes.

Generally stated, the object of my invention is to simplify compensating systems of this general type.

Another object is to improve the performance and facilitate the adjustment of such systems.

A further object is to provide a compensating system suited for use with both direct current and alternating current circuits.

A still further object is to provide a system in which the compensation is independent of the phase relations between the voltage and current acting in an alternating current regulated circuit.

In practicing my invention, I equip the control device of the regulator with an action-modifying element which is influenced by a measure of the regulated circuit load current and which responds to the first power of this current to thereby give a uniform degree of compensation throughout the entire load range of the circuit. This element is electrically and magnetically independent of the circuit-voltage-energized main control winding of the control device and thus variations in the phase relations of the regulated circuit quantities in no way alter its modifying operation.

One preferred form of construction for this element comprises a winding which floats in a unidirectional magnetic field and which is energized by a unidirectional current determined by the regulated circuit current. In the case of alternating current applications, a current transformer and a rectifier are included in the element energizing circuit. A current shunting rheostat is preferably also included in this circuit for the purpose of adjusting the degree of compensation.

Figure 1:
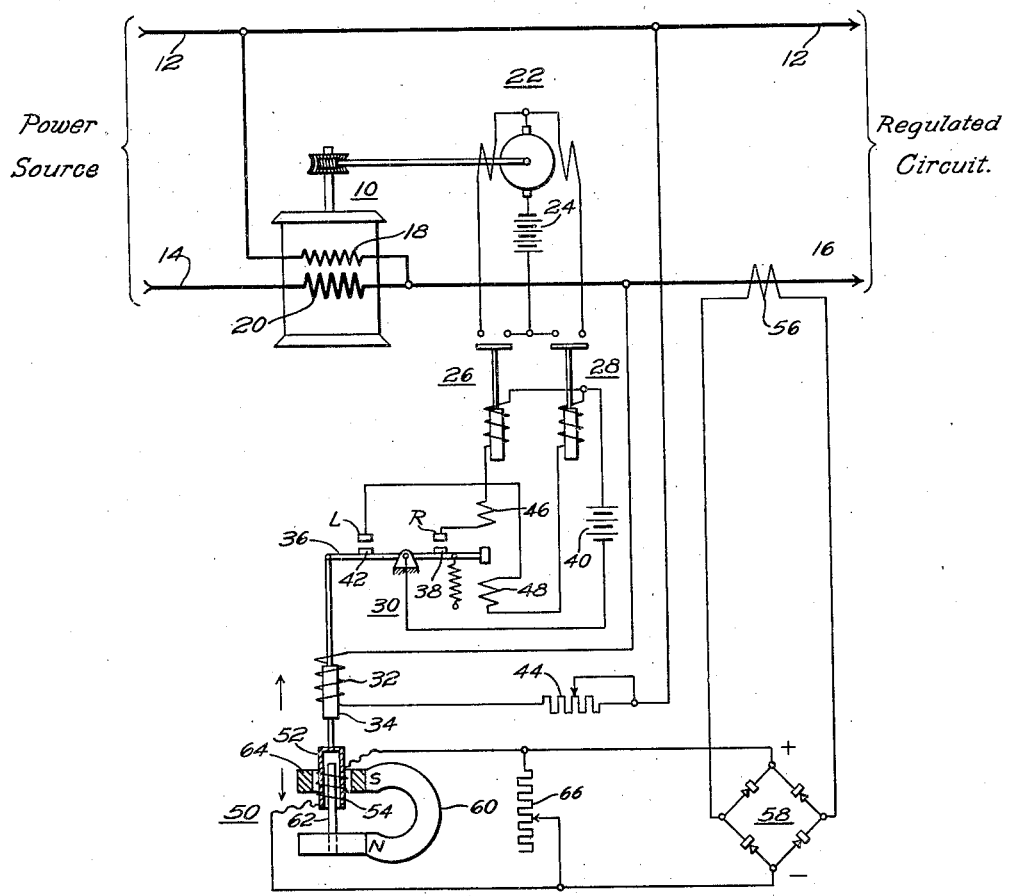
Figure 2:
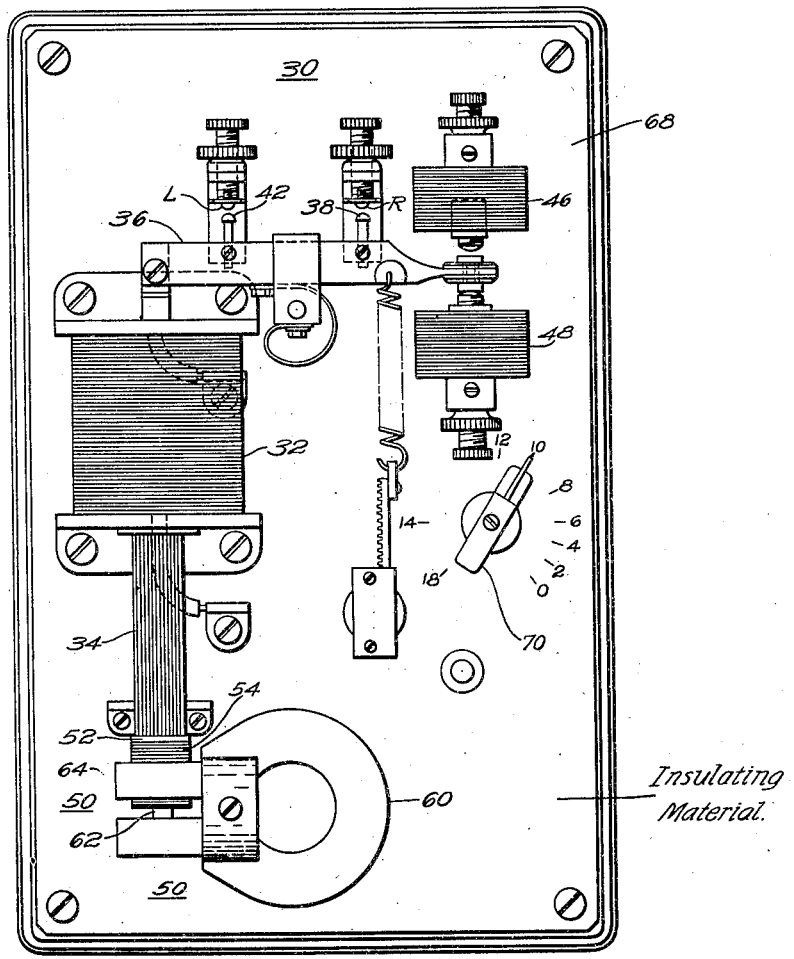

My invention will best be understood from the following description of a specific embodiment thereof, when taken in conjunction with the accompanying drawings, in which Figure 1 is a diagrammatic view of apparatus and circuits showing the compensating means of my invention applied to the contact-making control device of an induction type voltage regulator associated with an electrical feeder circuit, and Fig. 2 is a mechanical view of the contact making control device and the action modifying element of my invention comprised by the system of Fig. 1.

Referring to Fig. 1 of the drawings, I have there indicated an induction regulator 10 so connected between a source of alternating current power 12—14 and a feeder circuit 12—16 as to regulate the voltage of this circuit. The illustrated regulator is of a well known type comprising an exciting winding 18 energized by the power source voltage and a secondary or corrective component producing winding 20 series connected in the manner shown in one of the conductors of the regulated circuit.

For the purpose of adjusting the magnetic coupling between these two windings to thereby alter the magnitude and phase position of the voltage induced in winding 20, the regulator is equipped with an operating motor 22, which, when energized from a suitable source 24 by the actuation of a control relay 26, operates the regulator 10 in the circuit-voltage-raising direction and when similarly energized by the actuation of a second control relay 28 operates the regulator in the opposite or circuit-voltage-lowering direction. Relays 26 and 28 are selectively controlled by a primary relay 30 of the contact making voltmeter type which is illustrated as comprising an actuating winding 32 which is energized by a measure of the voltage of the regulated circuit 12—16.

In operation of the regulating system thus far described, as long as the regulated circuit voltage is of the desired value, no adjustment of the regulator 10 is effected. Should, however, the voltage decrease, control device winding 32 decreases the upward pull exerted upon magnetic plunger member 34 and allows the pivoted contact carrying arm 36 to rotate in the counter-clockwise direction to a position in which contact member 38 engages a stationary member R.

This completes, from a suitable control source 40, an actuating circuit for relay 26 and causes, in the manner already explained, motor 22 to correctively operate regulator 10 in the voltage raising direction. In a similar manner, should the circuit voltage exceed its desired value, a contact member 42 of the primary relay engages a second stationary member L and actuates relay 28. As a result regulator 10 is correctively adjusted in the voltage lowering direction.

The magnitude of this regulated voltage may be adjusted by means of a rheostat 44 connected as in the manner shown in the circuit of the control device winding 32. The illustrated auxiliary windings 46 and 48 serve in well known manner to increase the pressure of contact engagement.

In order that a regulating system of the type represented may modify the value of voltage which it maintains in accordance with changes in the loading of the regulated circuit, compensating means are required. When arranged in the improved manner of my invention, such a means preferably takes the form of an element, indicated generally at 50, which functions to modify the action of the control device 30 in accordance with changes in the load current of regulated circuit 12—16.

This element is illustrated as comprising a hollow cylindrical sleeve member 52 which carries a floating winding 54, which winding is energized by a measure of the regulated circuit current through a circuit which includes a current transformer 56 and a rectifier 58. The winding is subjected to a unidirectional magnetic field which may conveniently be produced by a permanent magnet 60 of the horseshoe type.

To the lower pole of this magnet is attached a magnetic material rod member 62 which projects into the hollow portion of the winding supporting sleeve 52. This sleeve is preferably of non-magnetic material and is mechanically interconnected with the main armature member 34 of the regulator control device 30. The upper pole of permanent magnet 60 carries a ring attachment 64 which surrounds the element winding 54 and which causes the unidirectional magnetic flux of magnet 60 to thread through the turns of winding 54 in passing from member 64 to member 62 therewithin.

In operation of the compensating means just described, the unidirectional current applied to winding 54 produces a downward pull in opposition to the upwardly acting force exerted upon the main armature 34 of the regulator control device. The magnitude of this pull varies as the first power of the current acting in the regulated circuit and thereby requires that the circuit supply to winding 32 of the control device a voltage which becomes progressively higher than normal as the regulated circuit load current rises. As a result, an increase in the circuit loading causes the regulator to proportionately raise the voltage which it maintains by a magnitude which may be selected to compensate for the line drop between the regulator and a distant point or to otherwise vary in predetermined manner.

This magnitude may, of course, be adjusted in a number of manners as by the provision of taps (not shown) on the modifying element winding 54 or as in the manner shown by the use of a rheostat 66 which, depending upon its resistance adjustment, shunts a greater or lesser portion of the current from transformer 56 away from element 50. When this shunting resistance is high, the degree of compensation, is, of course, greatest and when lowered the compensation degree is correspondingly decreased.

In Fig. 2 I have shown one preferred mechanical arrangement for the action-modifying element 50 of my invention and the regulator control element 30 with which it is combined. The illustrated apparatus is supported from a panel 68 of insulating material which is adapted to receive a protecting cover (not shown). The main control winding 32, the armature member 34, contact members L and R and all other elements of the device occupy positions corresponding to those shown in the diagram of Fig. 1.

A similar comment applies to the action modifying element 50 of my invention, the permanent magnet 60, magnetic circuit members 62 and 64 and the winding supporting sleeve 52 being indicated in the same relation in both Figs. 1 and 2. The adjusting rheostat 66 is mounted behind the panel 68 and utilizes a front-projecting adjusting member indicated at 70 in Fig. 2.

It is desired to here point out that an important consideration in the success of my improved compensating system lies in the fact that the control-action modifying element 50 thereof responds to the first power only of the regulated circuit current. Were it to be of a simpler type having a core member arranged for self magnetization, it would respond to the second power of this current and would give insufficient compensation at lower loadings of the regulated circuit and highly excessive compensation at the higher loadings. The mentioned self-excited form of solenoid construction functions satisfactorily in the case of the main regulator control element 30 for the reason that the range of voltage change to which it is subjected is restricted to a very small percentage rather than to from zero to full rating, as is the case of the action modifying element 50.

Electrically and magnetically, this action modifying element is entirely independent of regulator control device 30. Consequently changes in the phase relation between the voltage and current of the regulated circuit in no way alter its performance. My improved system is furthermore equally adapted to direct current circuits, in which case the current transformer 56 of the diagram of Fig. 1 should be replaced by a shunt and the rectifier 58 eliminated from the element energizing circuits.

Although I have shown and described a certain specific embodiment of my invention, I am fully aware that many modifications thereof are possible. My invention, therefore, is not to be restricted except insofar as is necessitated by the prior art and the scope of the appended claims.

I claim as my invention:

1. In a system comprising an electrical circuit to be regulated and a regulator responsive to the voltage thereof, the combination of circuit-load compensating means comprising a control-modifying element for the regulator, and means for actuating said element comprising a winding movably mounted in a field of constant flux density and energized by a measure of the circuit current, thus biasing said element in accordance with the first power of its energizing current.

2. In a system comprising an electrical circuit, voltage-adjusting means therefor, and a device responsive to the voltage of said circuit for controlling said adjusting means, the combination of compensating means comprising an action-modifying element for said control device and means for actuating said element in a field of constant flux density so that it is biased in accordance with the first power of the current flowing in said circuit.

3. In a system comprising an electrical circuit, voltage-adjusting means therefor and a device responsive to the voltage of said circuit for controlling said adjusting means, the combination of a compensating element for said control device comprising a floating winding, means for subjecting said winding to a unidirectional magnetic field of unvarying flux density, and means for supplying to said winding a unidirectional current determined by the load current of said electrical circuit.

4. In a system comprising an alternating current feeder circuit, voltage adjusting means therefor, and a device responsive to the circuit voltage for controlling said adjusting means, the combination of an action-compensating element for said control device comprising a floating winding, means for subjecting said winding to a unidirectional magnetic field of unvarying flux density, a rectifier connected to said winding, and means for energizing said rectifier by a measure of the feeder-circuit current.

5. In a regulating system for controlling the voltage of an electrical circuit, a voltage regulator responsive to the voltage of the circuit, a control-modifying element for the regulator to compensate for variations in load current, and means for actuating said element comprising a winding movably mounted in a magnetic field uncontrolled by the current in the winding which is energized by a measure of the current of said circuit that it responds to the first power of said current.

6. In a system comprising an electrical circuit and a voltage regulator therefor, the combination of a control modifying element for said regulator comprising a floating winding, means for subjecting said winding to a unidirectional magnetic field of unvarying flux density, and means for so energizing said winding by a unidirectional current determined by the current of said electrical circuit as to impart to the regulator a rising voltage-with-circuit-load characteristic.

7. In a system comprising an alternating-current feeder circuit and a voltage regulator therefor, the combination of a control-modifying element for said regulator comprising a floating winding, means for subjecting said winding to a unidirectional magnetic field of unvarying flux density, a rectifier connected to said winding, and means for energizing said rectifier by a measure of the feeder-circuit current, the above-recited connections being such that the regulator has imparted to it a rising voltage-with-circuit-load characteristic.

8. In a voltage regulating system, a circuit to be regulated, means for governing the voltage of said circuit including a relay having an element responsive to the voltage of said circuit and an element responsive to the load current of said circuit, said two elements being magnetically independent and mechanically connected, said compensating element comprising a winding movable in a field of constant flux density, and means for energizing said winding with a unidirectional current in accordance with the load current of said circuit to be regulated.

9. In a voltage regulating system, a circuit to be regulated, means for governing the voltage of said circuit including a relay having a pair of mechanically interconnected electrically independent movable elements, means for biasing one of said elements in accordance with the regulated voltage, and means comprising a winding movable in a field of constant flux density for biasing the other element in accordance with the first power of said load circuit to compensate the regulator to increase the regulated voltage in direct proportion to an increase in load current.

10. In a voltage regulator system, a circuit to be regulated, means for governing the voltage of said circuit including a relay having two mechanically interconnected movable elements, means for biasing one of said elements in accordance with the voltage of the regulated circuit, and means for biasing the other of said elements to compensate said relay for variations in the load current of said regulated circuit, said compensating element comprising a winding energized with a unidirectional current that is a measure of the load current operating in a unidirectional field of constant intensity.

11. In a voltage regulator system, an alternating-current circuit to be regulated, means for governing the voltage of said circuit including a relay having two mechanically interconnected movable elements, means for biasing one of said elements in accordance with the voltage of the regulated circuit, and means for biasing the other of said elements to compensate said relay for variations in the load current of said regulated circuit, said compensating element comprising a permanent magnet core having an air gap traversed by magnetic flux of unvarying intensity, a coil movably mounted to operate entirely within said air gap, and means for supplying a unidirectional current to said coil that is a measure of the load current of the regulated circuit.

LESTER G. TUBBS.